C. H. CARTER.
DISPLAY APPARATUS.
APPLICATION FILED APR. 5, 1918.

1,297,542.

Patented Mar. 18, 1919.
7 SHEETS—SHEET 1.

Fig. 1.

Inventor
Charles H. Carter
By his Attorney

C. H. CARTER.
DISPLAY APPARATUS.
APPLICATION FILED APR. 5, 1918.

1,297,542.

Patented Mar. 18, 1919.
7 SHEETS—SHEET 5.

C. H. CARTER.
DISPLAY APPARATUS.
APPLICATION FILED APR. 5, 1918.

1,297,542.

Patented Mar. 18, 1919.
7 SHEETS—SHEET 6.

Inventor
Charles H. Carter
By his Attorney

UNITED STATES PATENT OFFICE.

CHARLES H. CARTER, OF BROOKLYN, NEW YORK, ASSIGNOR TO MONTAIGU M. STERLING, OF NEW YORK, N. Y.

DISPLAY APPARATUS.

1,297,542.   Specification of Letters Patent.   Patented Mar. 18, 1919.

Application filed April 5, 1918. Serial No. 226,883.

*To all whom it may concern:*

Be it known that I, CHARLES H. CARTER, a citizen of the United States, and resident of borough of Brooklyn, in the county of Kings and State of New York, have invented certain new and useful Improvements in Display Apparatus, of which the following is a specification.

This invention relates to display advertising apparatus, comprehending a compact structure of relatively small dimensions, in the form of a cabinet, wherein at plural translucently covered openings or screens in its walls respectively and alternately are exposed illuminated pictorial or other representations for set periods of intermittent display.

A salient feature of invention in the apparatus resides in the employment of a single source of illumination for the purpose of projecting changing pictorial or other representations, with successive intermittency, upon differently positioned screens, mounted in the cabinet walls in order that they may be apparent to onlookers from different angles.

A further feature consists in the arrangements of lens groups in such manner that the pictorial or other representations, derived from slides which may be colored, are projected with vivid clarity and distinctness, enlarged, upon the respective screens.

Further I provide a separated compartment in the cabinet having a permanent transparency, with a source of illumination which glows to expose it in intermittency alternating with the illuminatory periods of the other source of light. An endless carrier, bearing readily attachable and detachable slide frames, is arranged within the cabinet to travel past the different screens, and the alternating periodicity of illumination of the permanent transparency, to successively carry, and bring to rest in a step by step movement, each of a series of slides, in position for the representations thereon to be projected, through the lens groups, upon each screen, by means of the single source of illumination.

The novel arrangement of the cabinet, and of the contained lens groups, slide carriers, movable supports therefor, and the illuminating means, enable the use of a relatively large number of slides within the compass of a small and compact cabinet.

My invention still further comprises, where electric lamps serve as the sources of illumination for both the moving slides and the stationary slide, automatic circuit controlling mechanism whereby the lamp serving the moving slides is energized at the moment a slide comes to rest before its exposure screen, at which time the lamp for the stationary slide is deënergized; and said first named lamp is deënergized just prior to the setting in motion again of the slide carrier, at which time the lamp for the stationary slide is reënergized.

The intermittency and periodicity of illumination of the repsective screens are relied upon to arrest the attention of passers by, and the changing pictures or representations, thus drawn to attention, afford novel and attractive features of considerable advertising value.

I am enabled to drive a motor to operate the carrier, and also to energize both lamps, from a single source of electrical energy; the agency of engaging and disengaging mechanism serving to intermittently communicate the motor drive to the carrier; and switch control mechanism serving to synchronize the operation of the lamps, respectively, with the periodicity of the carrier movements.

Other features and advantages of my said invention will hereinafter appear.

The cabinet or container for the operative elements of the apparatus may be rectangular, in general form, having the vertical side walls 1 and 2, front wall 3, rear wall 4, top 5; and an upper forward compartment 6 having an opening 7 in which is fitted a permanent transparency or slide 7ª, said opening being arranged in a plane lying in a downwardly forward angle. Said cabinet contains a frame composed of horizontal members 8, connected by vertical standards 9, which have angular braces 10. The character of the cabinet and frame structure is relatively unimportant, except that it be compact and suited to the purpose of inclosing and supporting the operative elements.

Thus the frame supports two sets of sprocket wheels 11, located, respectively, near opposite sides of the cabinet, each set comprising two lower wheels and two upper wheels, and each set supporting a carrier member in the form of an endless sprocket chain 12. The sprocket wheels are journaled in separate brackets 13 which are mounted upon the frame, and the sets of sprocket wheels permit the movement of the chains, which latter themselves serve as carriers for a series of slide frames, in a manner and for the purpose to be described hereinafter.

Motion is communicated to the carrier chains by means of a gear wheel 14, driven by a worm 15, which is rotated by a motor 16, run from a suitable source of electrical energy. The motion thus imparted to the carrier chains is intermittent in character, and allows periods of rest to alternate with the forward steps. Obviously the extent in time of the alternate periods of movement and rest may vary, and I have found it desirable, for the purposes of the present example of my invention, that the rest periods should exceed the motion periods, as will be described hereinafter.

In order that movement from the gear wheel 14 may be transmitted to the carrier, I provide a lateral spur, in the form of a roller 17, mounted near the periphery of said gear wheel, and I affix a number of cams 18 upon a surface of one of a pair of sprocket wheels 11, which are mounted on a shaft 11ª, said gear wheel and sprocket wheel having such relative overlapping arrangement that they may rotate through adjacent, parallel planes, whereby the several cams will successively enter into the path of spur 17, and so that the sprocket wheel may be given a partial turn, through co-action of spur and cam, in each complete revolution of the sprocket wheel. For this co-action between spur and cam, it will be noted that the cam 18, which lies radially upon the sprocket wheel 11, has an inclined face 19 opposed to the spur, and that the cam is pointed in an angle in advance of a line bisecting the axes of wheels 14 and 11 when the spur first meets said incline, and then that as the wheel 14 continues to rotate, the spur rides up incline 19, while turning wheel 11 oppositely, until the cam is pointing about along the said line of bisection. Then the spur 17 rides over the rear end of incline 19, and while still continuing to bear against the cam, to maintain movement of wheel 11, the spur rides down an opposite, heel incline 20 on said cam, which motion, according to the arrangement here indicated completes the movement of wheel 11 through a quarter turn, and brings the next succeeding cam 18 into position to be met by the spur in the succeeding revolution of wheel 14. Thus the period of movement accorded the carrier chains is represented by the time occupied in a quarter turn of the gear wheel 14, and the period of rest for said carrier chains is represented by the time occupied in the remaining three quarters turn of said gear wheel.

Figure 6:
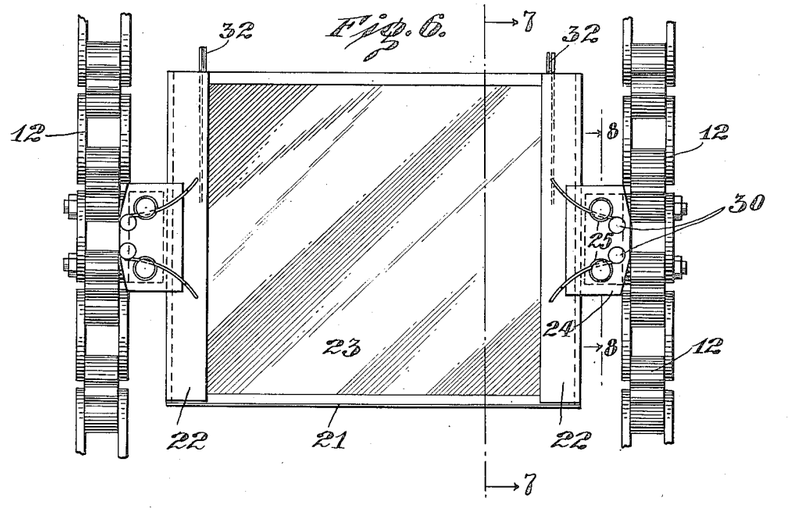
Fig. 6 is a plan view of one of the slides and its means of detachable connection with the carrier.
Figure 7:
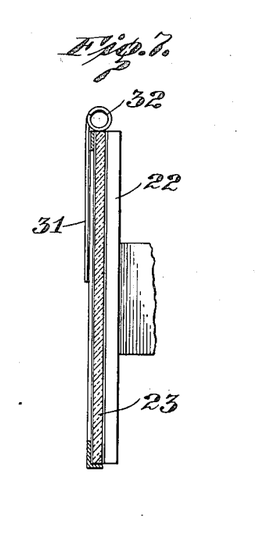
Fig. 7 is a section on the line 7—7 of Fig. 6.
Figure 8:
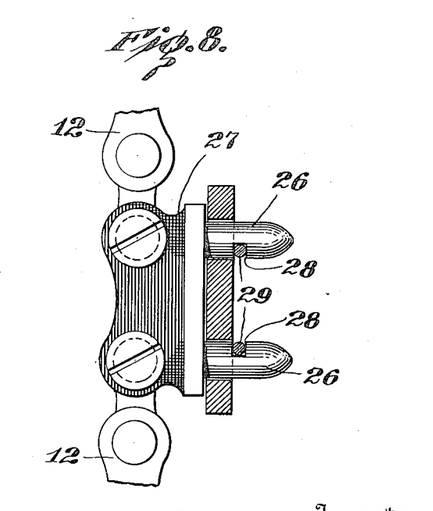
Fig. 8 is a section on the line 8—8 of Fig. 6.

A series of frames 21 are detachably mounted upon the carrier chains, (see Figs. 6, 7 and 8) each frame having the opposite, lateral guides 22 to receive a slide 23. Also, extending laterally from each side of frame 21 is a lug 24, having holes 25, to receive a pair of studs 26, that project for the purpose from a link of the sprocket chain 12. This link, as shown at 27 in Fig. 8, may be specially formed with integral studs 26 for the purpose. The studs 26 may be provided with opposed slots 28, to receive tension wires 29, whose inner ends are secured, as at 30, upon the lug 24, and entered, by their retractile force, within the slots 28, to thus form a lock which secures the frame 21 against accidental removal from the carrier chains. Obviously, under this arrangement, the frame can be released by grasping the free ends of tension wires 29, and pressing them toward each other, thereby withdrawing them from slots 28, whereupon the lugs can be lifted off the studs 26, thus removing the frame.

The slide, as 23, may be secured within the frame 21 by means of snap fastenings in the form of pieces of spring wire 31, fixed to opposite sides of the frame, and each having its outer end coiled, as at 32, the coil portion snapping over the outer edge of the frame and finding tensional lodgment upon the outer edge of the contained slide.

For release of the slide the coil is snapped back behind the rear perimeter of the frame edge.

The slide frames 21 are located at even, predetermined distances apart along the carrier in coördination with the travel movements given said carrier, so that they may successively come to rest in between a condenser 33 and a projector 34, which each may comprise a lens system of suitable character. The same axis runs through both lens systems, and a lamp, as 35, is located at the rear of the condenser, to direct its light rays therethrough, and to cause the representation upon the slide to be projected upon a screen 36, mounted in an opening 37 in the front wall of the cabinet.

A similar screen or permanent transparency 38 is shown in the example as mounted in an opening therefor in the top of the cabinet, and corresponding lens systems comprising a condenser 39 and projector 40, are provided to coöperate with the same lamp 35, at this different angle, to display the representations on the slides, successively in the same order, and under similar timing conditions, upon said screen 38.

I have thus established, with the two sets of display devices shown, practical means whereby, through the employment of a single source of illumination, pictorial and other representations, can be exposed on a plurality of screens, located in different angles distant from the light center, whereby the display effect is multiplied with a minimum consumption of electric current, and whereby the advertising efficiency of a display apparatus is enhanced.

As means for permitting the use of an increased length of carrier chains 12, to thus enable the employment of a greater number of slides within a limited cabinet area, I provide additional sprocket wheels 41, journaled at inset positions, and thereby conduct the chains inwardly from the front of the cabinet, to thus allow for an ample clearance space between the projector and screen, in this manner obviating the necessity of extending the screen out beyond the front wall of the cabinet. By these means compactness in the apparatus is achieved, while at the same time the slide carrying capacity of the chains is increased.

Some of the slides, as 42, are rotatably mounted in their frames, and are furnished with crown gears 43, adapted to enter into mesh with gears 44, journaled in position to revolve said slides when they are at rest for exposure. Pinions 45, carried by the gears 44, are driven by a chain 46, that derives its motion from a pinion 47 carried by and rotating continuously with the gear 14.

The permanent slide 7ª is illuminated by one or more lamps 48, and the general lighting arrangement comprehends the illumination of slide 7ª during those periods when the series of slides 23 are in motion, at which times the lamp 35 is out, because I do not wish the slides 23 to be displayed while they are in motion, only desiring to expose them between the times when their motion is arrested and about to start again. Therefore current, from a source of electrical energy, as A, is switched from the lamps 48 when the slides 23 have had their motion arrested, and is caused to energize the lamp 35 to the point of incandescence. This may be accomplished by including the lamps 48ª in a shunt circuit 49, (see Fig. 10) with the contact points of a switch 50, the main light circuit 51 including the lamp 35, which presents what is termed "cold resistance" and does now glow while switch 50 is open. But when the slides 23 have again come to rest, then, through switch mechanism operating in synchronism with the carrier in its periods of rest and movement, the switch 50 is automatically closed so that the current builds up to energize the lamp 35 to the point of incandescent illumination.

Figure 10:
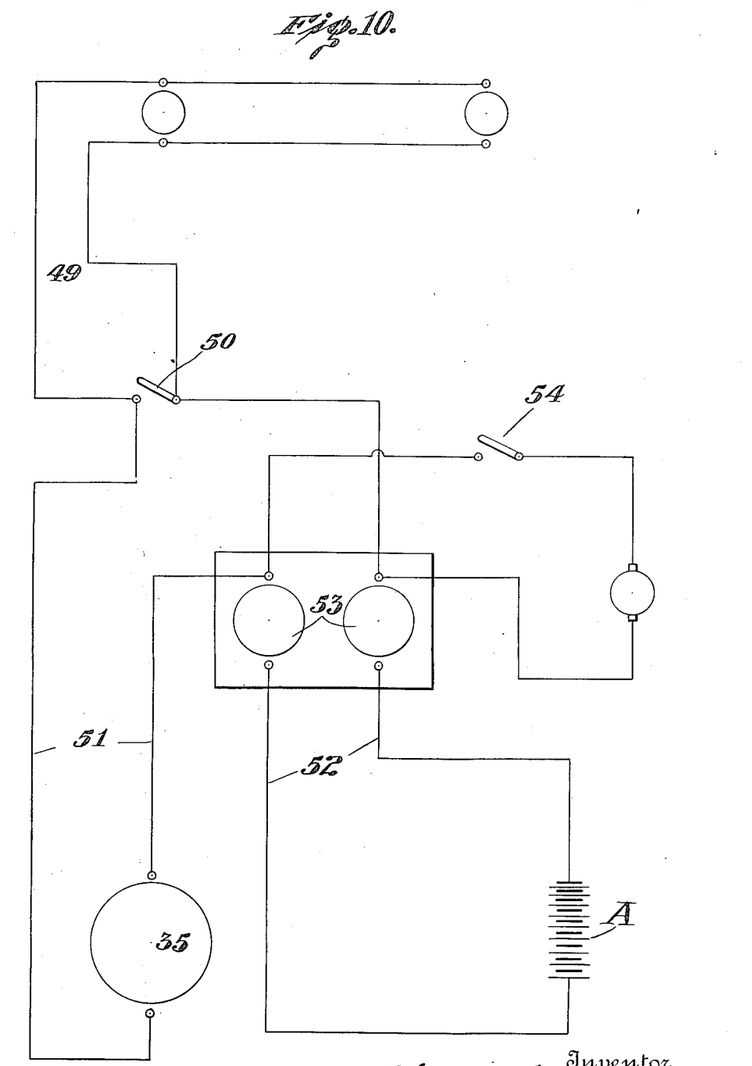
Fig. 10 is a diagram of the electrical circuits employed.

Fig. 10 also illustrates the circuit 52 which includes the motor 16, safety fuses 53, and switch 54, whereby the motor may be started and stopped.

The switch 50, which is normally open, comprises a lever, pivoted at 55, and having the contact arm 56, which is held apart from contact surface 57, by a spring 58, engaged with and drawing upon the opposite arm 59. A stud or post 60 extends out from arm 59, and lies within a segmental space 61 provided within the peripheral portion of a disk or wheel 62 of fiber or other insulation material, carried by the gear 14, to rotate therewith, said disk comprising a cam. But the advancing shoulder 63, bounding the forward end of space 61, will in the continued rotation of gear 14, cause shoulder 63 to abut against post 60, and thus to swing lever 50, so that its arm 56 will be forced into sliding contact with contact surface 57, effecting the closing of switch 50, and holding it closed until the major periphery of disk 62 has passed against said post, and the latter has been again drawn into the space 61, by spring 58, thus again opening switch 50.

For its noiseless operation, the switch arm 56 strikes against a cushion 64, and, that sparking may be avoided, said arm slides from contact surface 57 into an insulation surface 65 that is flush with said contact surface.

Since considerable heat is developed within the cabinet by the lamp 35 I may attach a fan, as 66, to the motor 16, openings being provided in the cabinet to allow fresh drafts of air to be drawn therethrough by the operation of said fan.

The lenses employed in this apparatus for projecting the slide representations upon the screens comprise each a condensing system as 70, and a projecting system, as 71. The condensing system is located between the lamp 35 and the slide, and the projecting system between the slide and the screen.

Figure 1:
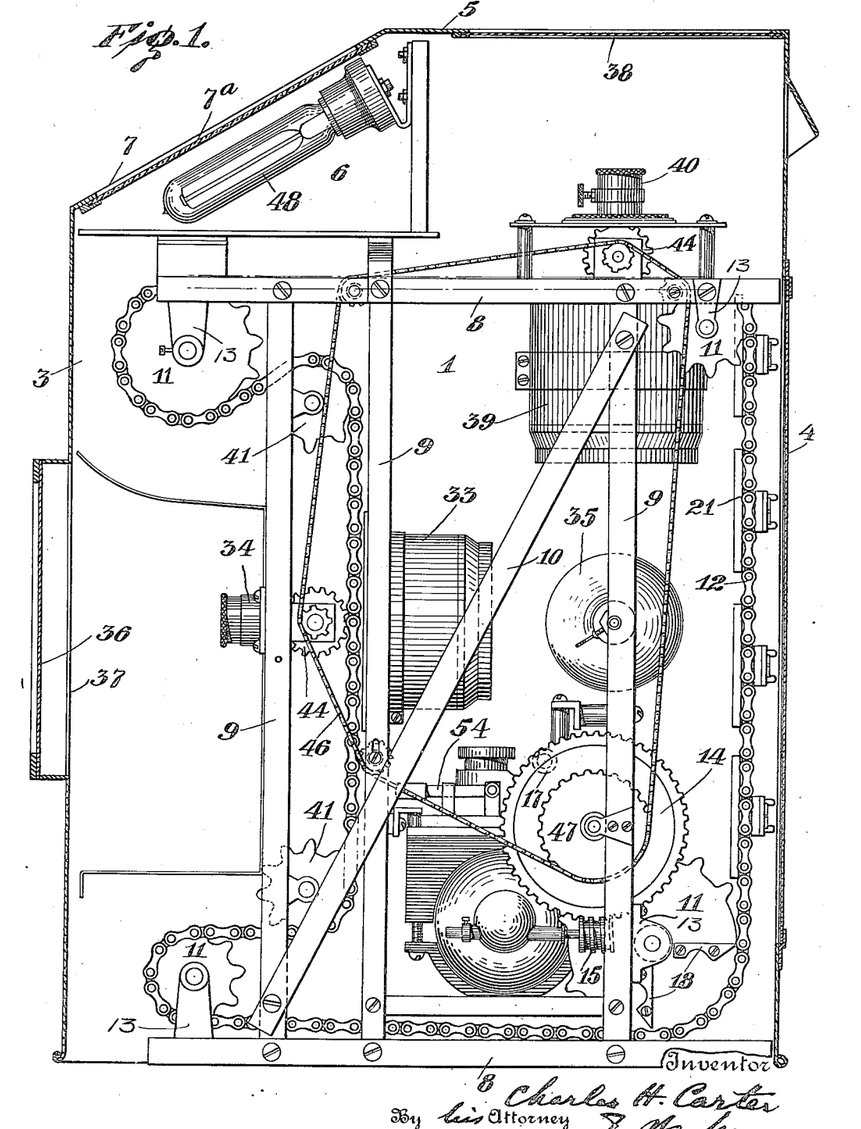
Figure 1 is a vertical, right side elevation of the improved apparatus, partly in section.
Figure 2:
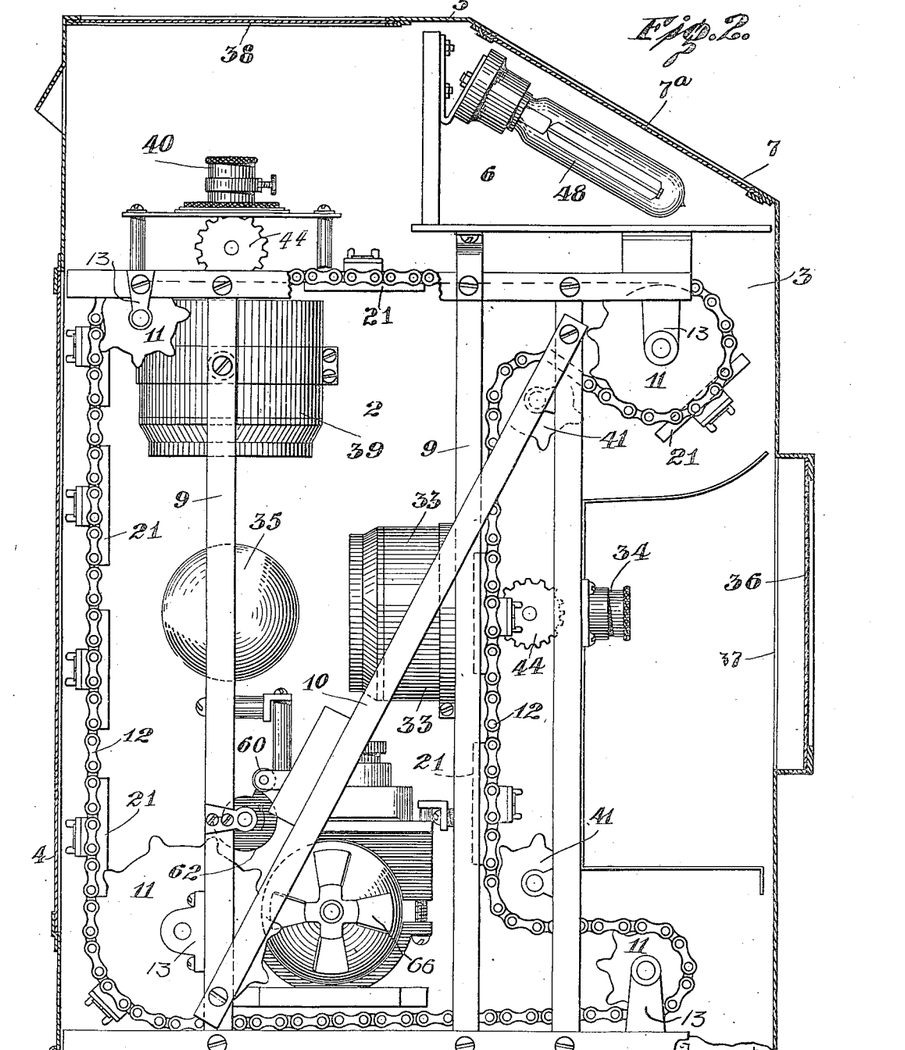
Fig. 2 is a corresponding left side elevation.
Figure 3:
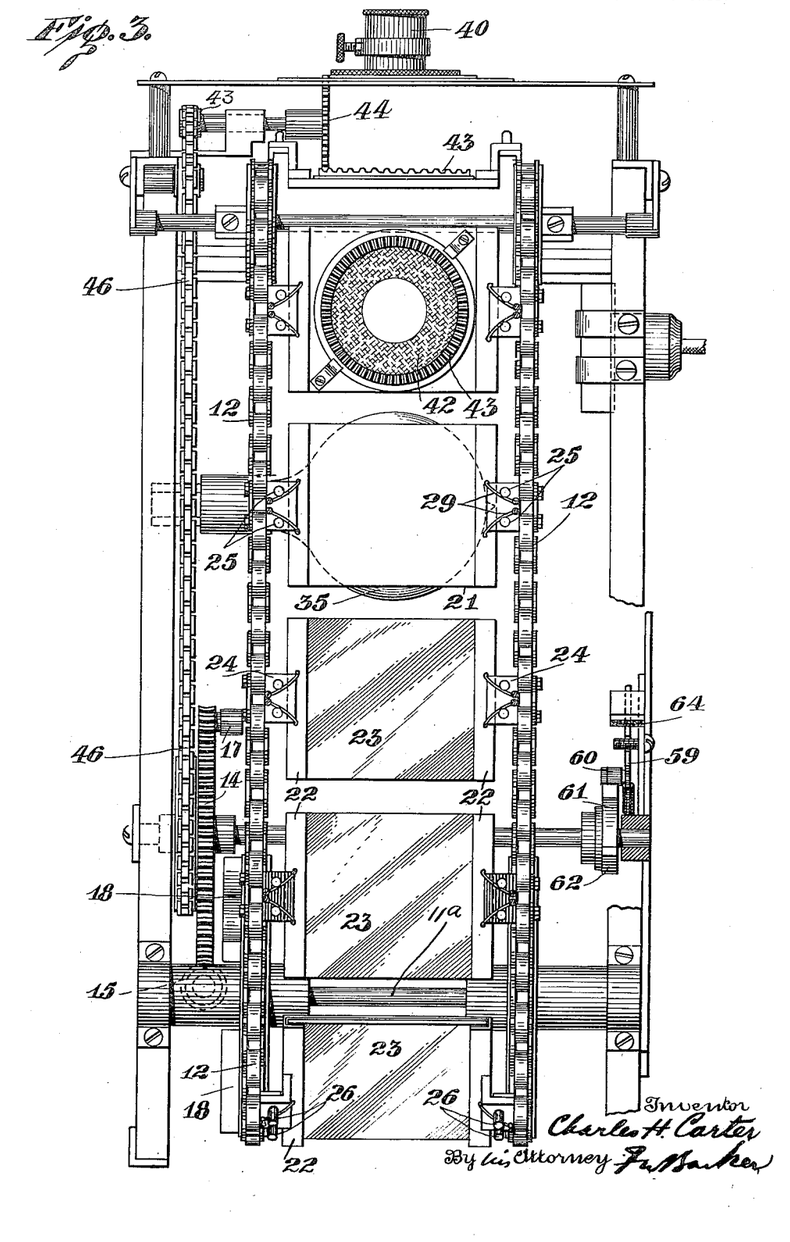
Fig. 3 is a corresponding, rear elevation.
Figure 4:
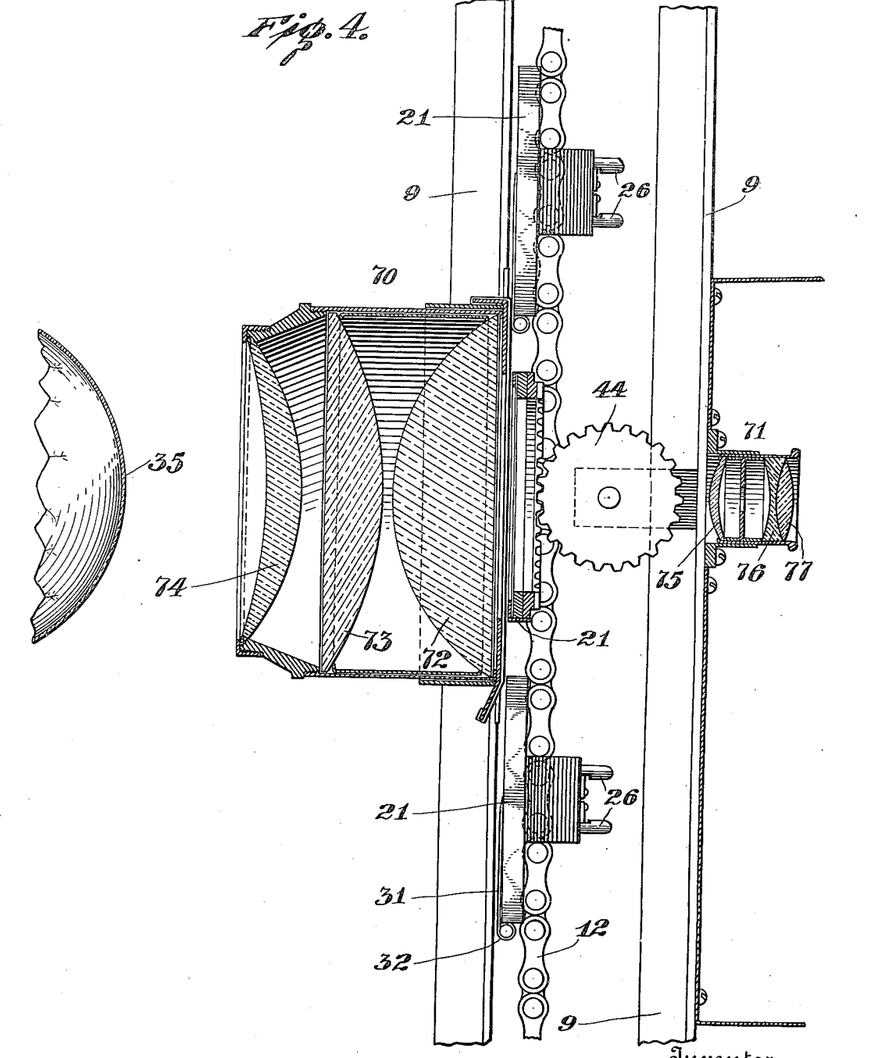
Fig. 4 is an enlarged, detail view, partly in section, of lens groups forming part of my invention.
Figures 5, 9:
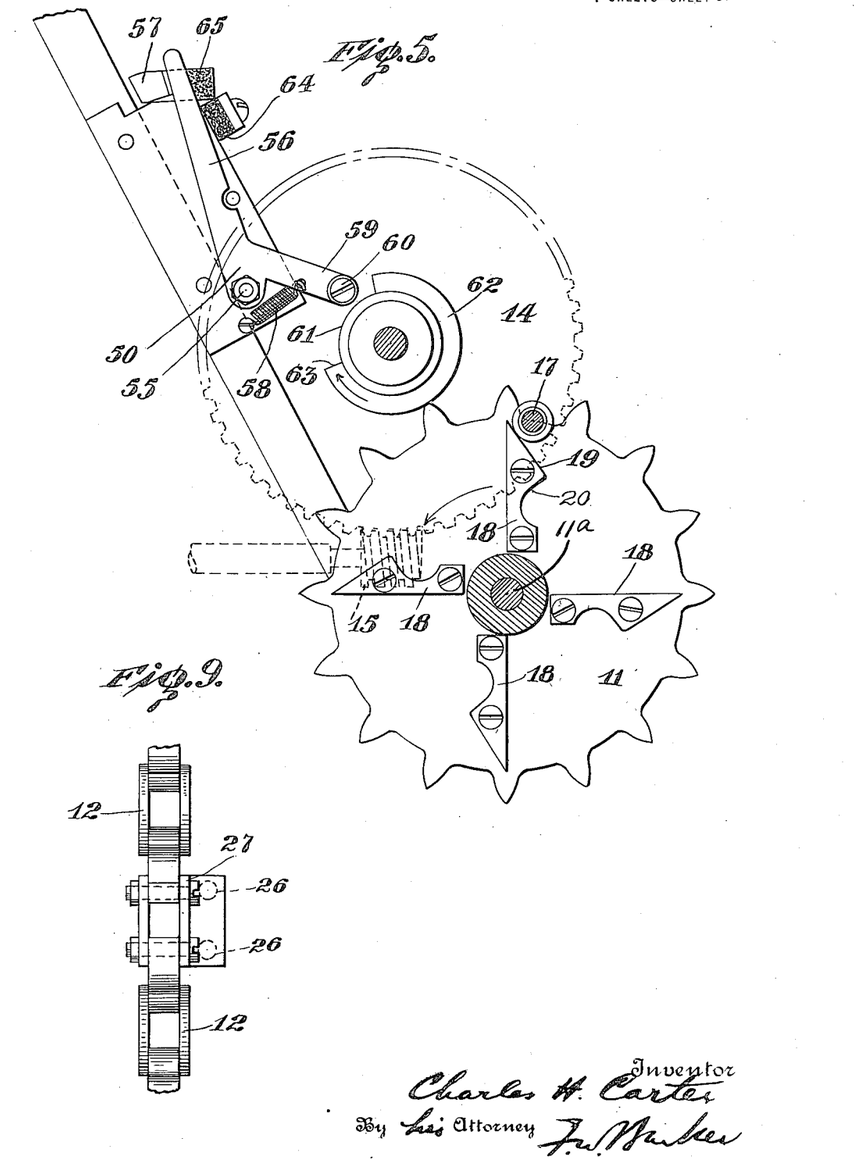
Fig. 5 is an enlarged, detail view of the switch operating mechanism.
Fig. 9 is a detail front view of a portion of a carrier chain, showing the special form of side bar to comprise a slide frame support.

These lens systems are mounted in telescopic cylinders, for focusing. The condensing system consists of the plano-convex lenses 72, 73, lens 72 having greater thickness than lens 73, the convex surfaces of said lenses being in opposed relation, and their plane surfaces respectively opposing the slide and a concavo-convex, or meniscus lens 74; which latter, at its concave surface, is in opposition to the lamp. The formulæ for the lenses 72, 73 and 74, which I have found desirable, are respectively as follows:—

$$0 - 8\tfrac{1}{4}$$
$$0 - 5\tfrac{1}{4}$$
$$+3 - 6\tfrac{1}{2}$$

The projecting lens system, which I have employed with success, consists of a meniscus lens 75, whose convex surface is opposed to the slide, and a composite lens composed of the dispersive element, 76, and the biconvex element 77, the formulæ for this system being:—

$$-4 + 9\tfrac{3}{4}$$
$$-7 + 2\tfrac{3}{4}$$
$$+4 + 6\tfrac{1}{2}$$

The lens measurements and groupings above indicated are presented because my experiments have proven that with lenses thus characterized I have been enabled to obtain good results within the very limited focal range which is available in the compact form of apparatus I have devised.

In the operation of my improved display advertising apparatus, it will be found that upon switching on the current, as by hand controlled switch 54, the motor, through its worm drive shaft 15, will rotate gear wheel 14, which by means of its spur 17, will give intermittent movement to the carriers 12, thereby bringing the slides in succession to rest before the condensers 33 and 39, at which times of rest radiance from the single lamp 35, which becomes energized in synchronism therewith, causes the representations on the slides to be projected upon the screens 36 and 38, so that two displays are created simultaneously, from different parts of the cabinet. Also, during the periods of travel of the slide carrier, to bring succeeding slides in objective range, at which times the lamp 35 is extinguished, the same circuit in those intervals, illuminates the lamps 48, in compartment 6, which light up the permanent transparency 7ª; so that the onlooker's attention may be continuously attracted toward the apparatus.

Variations may be resorted to within the spirit and scope of my said invention and parts thereof used without others.

I claim:—

1. In a display apparatus, in combination, a casing having an exposed screen, a lens system therefor, a source of illumination, means for conveying slides successively past said screen and lens system, for projection upon said screen; a fixed transparency, a separate source of illumination therefor, and means for energizing said sources of illumination separately in succession, whereby a slide and the fixed transparency are alternately illuminated.

2. In a display apparatus, in combination, a casing having a plurality of exposed screens arranged in different angular positions thereon, a lens system for each screen, a single source of illumination, means for conveying slides successively past said screens and lens systems, for projection on said screens, a fixed transparency, a separate source of illumination therefor, and means for energizing said sources of illumination separately in succession, whereby the slides and the fixed transparency are alternately illuminated.

3. In a display apparatus, in combination, a casing having a plurality of exposed screens, a lens system for each screen, a single source of illumination, a movable slide carrier, means for halting said carrier periodically when slides are respectively in positions for projection upon said screens, means for energizing said source of illumination during the halted periods of the slides, a fixed transparency, a separate source of illumination therefor, and means for energizing said sources of illumination separately in succession whereby the slides and the fixed transparency are alternately illuminated.

4. In a display apparatus, in combination, a casing having a plurality of exposed screens, a lens system for each screen, a lamp located at the point where the axes of said lens systems intersect, a series of slides, a carrier therefor means for moving said carrier intermittently, with periods of rest when slides are before respective screens, for projection thereon, means for energizing said lamp only during said periods of rest, a fixed transparency, a separate source of illumination therefor, and means for energizing said sources of illumination separately in succession, whereby the slides and the fixed transparency are alternately illuminated.

5. In a display apparatus, in combination, a casing having a plurality of exposed screens, a lens system for each screen, illuminating means common to said screens and lens systems, a series of slide frames having slides, an endless, carrier for said frames, to carry them singly, in succession past each of said screens in turn, means for halting said carrier during periods of rest when the slides are in projection relation with said screens, means for operating said illuminating means only during those periods of rest, a fixed transparency, a separate source of illumination therefor, and means for energizing said sources of illumination separately in succession, whereby the slides and the fixed transparency are alternately illuminated.

6. In a display apparatus having a casing, with exposure screens located at different sides thereof, a movable carrier, a series of slide-frames, bearing slides, borne by said carrier, for projection successively upon said screens, a lamp and lens series for said slides, a separate transparency exposure compartment, a lamp therefor, and means for alernately energizing said lamps to afford successive periods of exposure respectively, of the slides upon the screens and of the transparency.

7. In a display apparatus having a casing, a main compartment thereof, with exposure screens, and containing a series of slides to be displayed successively, for predetermined periods, on said screens, a lamp therefor, a separate compartment exposing a transparency, a lamp therefor, means for alternately illuminating said lamps during determined periods, and means for coördinating the display periods of said slides with the illuminatory periods of their respective lamps.

8. In a display apparatus having a casing, a main compartment therefor, with exposure screens, and containing a series of slides to be displayed successively for determined periods, on said screens, a lamp therefor, a separate compartment exposing a transparency, a lamp therefor, an electrical circuit including said lamps, a motor, a cam driven thereby, and a switch in said circuit, under the control of said cam, whereby said lamps are alternately energized for periods coördinating with the respective periods of display and travel of said slides.

9. In a display apparatus having a carrier composed of parallel sprocket chains, and means for moving said chains, the combination of slide holding frames each having a pair of oppositely and laterally extending lugs, with holes therein, a link of each chain having studs to enter the holes in said lugs to connect the frame and carrier, said studs having opposed recesses, and spring members, mounted on said lugs, to releasably enter said recesses to lock the frames in position.

10. In a slide holding device, in combination, a frame, lateral guide ways thereon for the reception of a slide, and spring strips secured to said frame, said strips terminating at their free ends in coiled portions capable of tensionally and releasably snapping over the frame edge, at its entrance, to lodge upon the slide outer edge and thus retain the slide lengthwise within the frame.

11. In a slide holding device, in combination, a frame, lateral guide ways thereon for the reception of a slide, and a spring strip secured to said frame, said strip terminating at its free end in a coiled portion capable of snapping back and forth over the frame edge, whereby, when snapped in one direction, said coil lodges upon the slide edge, to retain the slide within the frame, and, when snapped in the other direction, said coil is held out of the path of the slide to permit removal thereof.

Signed at borough of Manhattan, in the city, county and State of New York, this 3rd day of April, A. D. 1918.

CHARLES H. CARTER.

Witnesses:
F. W. BARKER,
C. S. ASHLEY.